US009227505B2

(12) United States Patent
Hata et al.

(10) Patent No.: US 9,227,505 B2
(45) Date of Patent: Jan. 5, 2016

(54) HYBRID VEHICLE DRIVING DEVICE (75) Inventors: Kensei Hata, Susono (JP); Yuji Iwase, Mishima (JP); Yosuke Suzuki, Susono (JP); Tomohito Ono, Gotenba (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/353,903

(22) PCT Filed: Oct. 27, 2011

(86) PCT No.: PCT/JP2011/074859
§ 371 (c)(1),
(2), (4) Date: Apr. 24, 2014

(87) PCT Pub. No.: WO2013/061453
PCT Pub. Date: May 2, 2013

(65) Prior Publication Data
US 2014/0296013 A1    Oct. 2, 2014

(51) Int. Cl.
*B60K 6/54* (2007.10)
*B60K 6/365* (2007.10)
*B60K 6/445* (2007.10)
*B60K 6/387* (2007.10)
*B60K 6/48* (2007.10)
*F16H 3/72* (2006.01)
*B60K 6/38* (2007.10)
*F16H 37/10* (2006.01)

(52) U.S. Cl.
CPC . *B60K 6/54* (2013.01); *B60K 6/365* (2013.01); *B60K 6/387* (2013.01); *B60K 6/445* (2013.01); *B60K 6/48* (2013.01); *F16H 3/728* (2013.01); *B60K 2006/381* (2013.01); *F16H 2037/101* (2013.01); *F16H 2200/2007* (2013.01); *F16H 2200/2035* (2013.01); *Y02T 10/6221* (2013.01); *Y02T 10/6239* (2013.01); *Y10S 903/911* (2013.01)

(58) Field of Classification Search
CPC ............ F16H 3/728; F16H 2200/2007; F16H 2200/2035; B60K 6/365; B60K 6/54
USPC ..................... 475/5, 296, 323, 286
See application file for complete search history.

(56) References Cited

U.S. PATENT DOCUMENTS

2006/0111213 A1 * 5/2006 Bucknor et al. ................ 475/5
2006/0276288 A1 * 12/2006 Iwanaka et al. ................ 475/5
2007/0265128 A1   11/2007 Conlon
(Continued)

FOREIGN PATENT DOCUMENTS

| CN | 101070904 A | 11/2007 |
|---|---|---|
| JP | 2005-297729 A | 10/2005 |
| JP | 2011-098712 A | 5/2011 |

*Primary Examiner* — Roger Pang
(74) *Attorney, Agent, or Firm* — Kenyon & Kenyon LLP (57) ABSTRACT

A hybrid vehicle driving device includes a first planetary gear mechanism, a second planetary gear mechanism, and a clutch, wherein a sun gear of the first planetary gear mechanism is connected to a first electric rotating machine, a carrier of the first planetary gear mechanism is connected to a driving wheel, a ring gear of the first planetary gear mechanism is connected to an engine, a sun gear of the second planetary gear mechanism is connected to a second electric rotating machine, the carrier of the second planetary gear mechanism is connected to the ring gear of the first planetary gear mechanism and the engine through the clutch, and a ring gear of the second planetary gear mechanism is connected to the driving wheel.

5 Claims, 10 Drawing Sheets

(56) References Cited

U.S. PATENT DOCUMENTS

| | | |
|---|---|---|
| 2008/0053723 A1 | 3/2008 | Kozarekar |
| 2010/0273595 A1* | 10/2010 | Seo et al. ............................ 475/5 |
| 2011/0111906 A1* | 5/2011 | Kim et al. .......................... 475/5 |
| 2011/0111909 A1* | 5/2011 | Kim et al. .......................... 475/5 |
| 2012/0004062 A1* | 1/2012 | Kim .................................. 475/5 |
| 2012/0083949 A1* | 4/2012 | Park ................................ 701/22 |
| 2013/0041535 A1* | 2/2013 | Choi et al. ...................... 701/22 |
| 2013/0331216 A1* | 12/2013 | Tuckfield et al. ................. 475/5 |

\* cited by examiner

|  |  | CL1 | CL0 | B1 |
|---|---|---|---|---|
| HV | ELECTRIC TORQUE CONTROL+MG2 DECELERATION MODE (HV-1) |  | ○ | ○ |
|  | FOUR-COMPONENT COMPLEX SPLIT MODE (HV-2) | ○ | ○ |  |
| EV | MG2 DECELERATION+MG1 DRAGGING LESS MODE (EV-1) |  |  | ○ |
|  | MG1, MG2 SPLIT MODE (EV-2) | ○ |  |  |
|  | MG1, MG2 DIRECT CONNECTION DRIVING MODE (EV-3) | ○ |  | ○ |

AXIAL DIRECTION

HYBRID VEHICLE DRIVING DEVICE

CROSS-REFERENCE TO RELATED APPLICATIONS

This is a national phase application based on the PCT International Patent Application No. PCT/JP2011/074859 filed on Oct. 27, 2011, the entire contents of which are incorporated herein by reference.

FIELD

The present invention relates to a hybrid vehicle driving device.

BACKGROUND

Conventionally, there has been known a hybrid vehicle driving device. For example, Patent Literature 1 discloses a hybrid electric vehicle power transmitting device that includes an engine, a pair of electric generator units, and a pair of gear devices.

CITATION LIST

Patent Literature

Patent Literature 1: U.S. Patent Application Publication No. 2008/0053723

SUMMARY

Technical Problem

There is still room for improving in the efficiency of the hybrid vehicle. For example, when the correlation between the speed reducing ratio and the transmission efficiency of the hybrid vehicle driving device can be set with high degree of freedom, the efficiency of the hybrid vehicle can be improved.

An object of the present invention is to provide a hybrid vehicle driving device capable of improving the efficiency of a hybrid vehicle.

Solution to Problem

A hybrid vehicle driving device according to the present invention includes a first planetary gear mechanism; a second planetary gear mechanism; and a clutch, wherein a sun gear of the first planetary gear mechanism is connected to a first electric rotating machine, a carrier of the first planetary gear mechanism is connected to a driving wheel, a ring gear of the first planetary gear mechanism is connected to an engine, and a sun gear of the second planetary gear mechanism is connected to a second electric rotating machine, a carrier of the second planetary gear mechanism is connected to the ring gear of the first planetary gear mechanism and the engine through the clutch, and a ring gear of the second planetary gear mechanism is connected to the driving wheel.

In the hybrid vehicle driving device, it is preferable to further include a second clutch configured to connect and disconnect the ring gear of the first planetary gear mechanism and the engine to and from each other; and a brake configured to regulate rotation of the carrier of the second planetary gear mechanism in an engagement state.

In the hybrid vehicle driving device, it is preferable that a plurality of running modes can be switched by engaging or releasing the clutch, the second clutch, and the brake, respectively, and a running operation in Mode 5 is realized by engaging the clutch and the brake and releasing the second clutch.

In the hybrid vehicle driving device, it is preferable that a plurality of running modes can be switched by engaging or releasing the clutch, the second clutch, and the brake, respectively, and three modes can be selectively realized as an EV running mode in which the engine is stopped and the hybrid vehicle runs by using at least one of the first electric rotating machine and the second electric rotating machine as a power source, the three modes including Mode 3 in which the clutch and the second clutch are released and the brake is engaged, Mode 4 in which the second clutch and the brake are released and the clutch is engaged, and Mode 5 in which the second clutch is released and the clutch and the brake are engaged.

In the hybrid vehicle driving device, it is preferable that the second clutch, the first electric rotating machine, the first planetary gear mechanism, the clutch, the second planetary gear mechanism, the brake, and the second electric rotating machine are disposed so as to be coaxial with a rotation shaft of the engine in order from a position near the engine.

Advantageous Effects of Invention

The hybrid vehicle driving device according the present invention includes the first planetary gear mechanism, the second planetary gear mechanism, and the clutch. The sun gear of the first planetary gear mechanism is connected to the first electric rotating machine, the carrier is connected to the driving wheel, the ring gear is connected to the engine, the sun gear of the second planetary gear mechanism is connected to the second electric rotating machine, the carrier is connected to the engine and the ring gear of the first planetary gear mechanism through the clutch, and the ring gear is connected to the driving wheel. There is an effect that the hybrid vehicle driving device according to the present invention can improve the efficiency of the hybrid vehicle.

DESCRIPTION OF EMBODIMENTS

Hereinafter, a hybrid vehicle driving device according to an embodiment of the present invention will be described with reference to the drawings. Furthermore, the present invention is not limited to the embodiment. Further, the components of the embodiment below include a component that can be easily replaced by the person skilled in the art or a component that substantially has the same configuration.

First Embodiment

Figure 1:
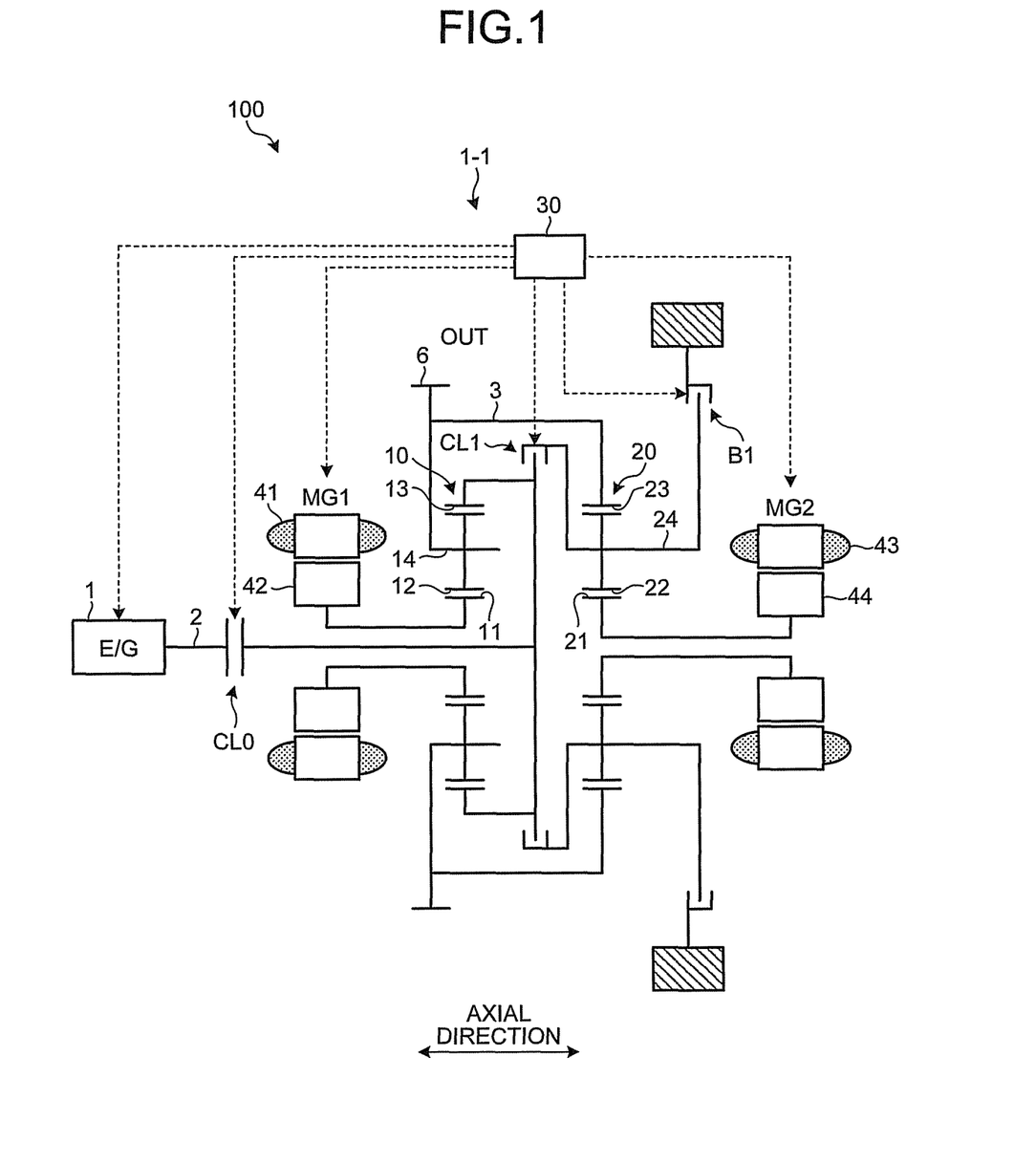
FIG. 1 is a skeleton diagram illustrating a main part of a hybrid vehicle according to a first embodiment.
Figure 2:
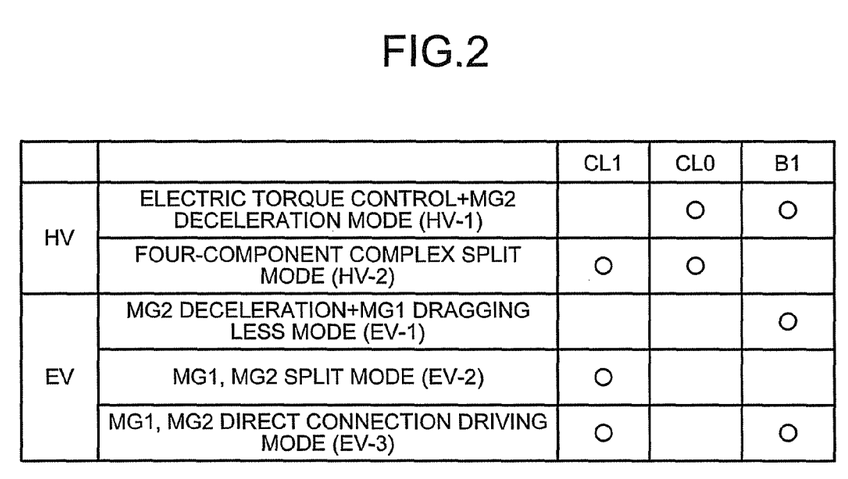
FIG. 2 is a diagram illustrating an engagement table of each running mode of the first embodiment.

Referring to FIGS. 1 to 9, a first embodiment will be described. This embodiment relates to a hybrid vehicle driving device. FIG. 1 is a skeleton diagram illustrating a main part of a hybrid vehicle according to the first embodiment of the present invention, and FIG. 2 is a diagram illustrating an engagement table of each running mode of the first embodiment.

As illustrated in FIG. 1, a hybrid vehicle 100 includes an engine 1, a first electric rotating machine MG1, a second electric rotating machine MG2, and a hybrid vehicle driving device 1-1. The hybrid vehicle driving device 1-1 of this embodiment includes a first planetary gear mechanism 10, a second planetary gear mechanism 20, a first clutch CL1, a second clutch CL0, and a brake B1. The hybrid system of this embodiment includes the hybrid vehicle driving device 1-1, the engine 1, the first electric rotating machine MG1, the second electric rotating machine MG2, and an ECU 30.

The first clutch CL1 is a clutch device that connects and disconnects a first ring gear 13 as a ring gear of the first planetary gear mechanism 10 and the engine 1 to and from a second carrier 24 as a carrier of the second planetary gear mechanism 20. The brake B1 can regulate the rotation of the second carrier 24 by the engagement.

A first sun gear 11 as a sun gear of the first planetary gear mechanism 10 is connected to the first electric rotating machine MG1, a first carrier 14 as a carrier of the first planetary gear mechanism 10 is connected to a driving wheel of the hybrid vehicle 100, and the first ring gear 13 is connected to the engine 1. A second sun gear 21 as a sun gear of the second planetary gear mechanism 20 is connected to the second electric rotating machine MG2, the second carrier 24 is connected to the first ring gear 13 and the engine 1 through the first clutch CL1, and a second ring gear 23 as a ring gear of the second planetary gear mechanism 20 is connected to the driving wheel of the hybrid vehicle 100. Furthermore, the first carrier 14 and the second ring gear 23 may not be directly connected to the driving wheel, and may be connected to the driving wheel through, for example, a differential mechanism or an output shaft.

The engine 1 converts the combustion energy of fuel into a rotational movement, and outputs the resultant to a rotation shaft 2. The rotation shaft 2 extends in, for example, the vehicle width direction of the hybrid vehicle 100. In the present specification, the "axial direction" indicates the axial direction of the rotation shaft 2 unless any particular remark is mentioned.

Each of the first electric rotating machine MG1 and the second electric rotating machine MG2 serves as a motor (an electric motor) and a generator. The first electric rotating machine MG1 and the second electric rotating machine MG2 are connected to a battery through an inverter. The first electric rotating machine MG1 and the second electric rotating machine MG2 can convert the electrical power supplied from the battery into the mechanical power and can convert the mechanical power into the electrical power while being driven by the power input thereto. The electrical power that is generated by the electric rotating machines MG1 and MG2 can be stored in the battery. As the first electric rotating machine MG1 and the second electric rotating machine MG2, for example, an alternating current synchronous motor generator can be used.

The first electric rotating machine MG1 includes a stator 41 and a rotor 42. The rotor 42 is disposed so as to be coaxial with the first sun gear 11 and is connected to the first sun gear 11 so as to rotate along with the first sun gear 11. The second electric rotating machine MG2 includes a stator 43 and a rotor 44. The rotor 44 is disposed so as to be coaxial with the second sun gear 21 and is connected to the second sun gear 21 so as to rotate along with the second sun gear 21.

The first planetary gear mechanism 10 and the second planetary gear mechanism 20 are respectively disposed so as to be coaxial with the rotation shaft 2, and face each other in the axial direction. The first planetary gear mechanism 10 is disposed near the engine in the axial direction in relation to the second planetary gear mechanism 20. The first electric rotating machine MG1 is disposed near the engine in the axial direction in relation to the first planetary gear mechanism 10, and the second electric rotating machine MG2 is disposed at the opposite side to the engine in the axial direction in relation to the second planetary gear mechanism 20. That is, the first electric rotating machine MG1 and the second electric rotating machine MG2 face each other in the axial direction with the first planetary gear mechanism 10 and the second planetary gear mechanism 20 interposed therebetween. The second clutch CL0, the first electric rotating machine MG1, the first planetary gear mechanism 10, the first clutch CL1, the second planetary gear mechanism 20, the brake B1, and the second electric rotating machine MG2 are disposed so as to be coaxial with the rotation shaft 2 of the engine 1 in order from the position near the engine 1. Furthermore, the arrangement of the electric rotating machines MG1 and MG2, the planetary gear mechanisms 10 and 20, the clutches CL0 and CL1, and the brake B1 in the axial direction is not limited thereto.

The first planetary gear mechanism 10 is of a single pinion type, and includes the first sun gear 11, a first pinion gear 12, the first ring gear 13, and the first carrier 14. The first sun gear 11 is disposed so as to be coaxial with the rotation shaft 2. The first ring gear 13 is disposed so as to be coaxial with the first sun gear 11 and is disposed at the outside of the first sun gear 11 in the radial direction. The first pinion gear 12 is disposed between the first sun gear 11 and the first ring gear 13, and engages with the first sun gear 11 and the first ring gear 13. The first pinion gear 12 is rotatably supported by the first carrier 14. The first carrier 14 is rotatably supported so as to be coaxial with the rotation shaft 2. Accordingly, the first pinion gear 12 can rotate (revolve) about the center axis of the rotation shaft 2 of the engine 1 along with the first carrier 14, and can rotate (spin) about the center axis of the first pinion gear 12 while being supported by the first carrier 14.

The second planetary gear mechanism 20 is of a single pinion type, and includes the second sun gear 21, a second pinion gear 22, the second ring gear 23, and the second carrier 24. The second sun gear 21 is disposed so as to be coaxial with the rotation shaft 2. The second ring gear 23 is disposed so as to be coaxial with the second sun gear 21 and is disposed at the outside of the second sun gear 21 in the radial direction. The second pinion gear 22 is disposed between the second sun gear 21 and the second ring gear 23, and engages with the second sun gear 21 and the second ring gear 23. The second pinion gear 22 is rotatably supported by the second carrier 24. The second carrier 24 is rotatably supported so as to be coaxial with the rotation shaft 2. Accordingly, the second pinion gear 22 can rotate (revolve) about the center axis of the rotation shaft 2 along with the second carrier 24, and can rotate (spin) about the center axis of the second pinion gear 22 while being supported by the second carrier 24.

The second carrier 24 is connected to the first ring gear 13 and the engine 1 through the first clutch CL1. The first clutch CL1 connects and disconnects the second carrier 24, the first ring gear 13, and the engine 1 to and from one another. When the first clutch CL1 engages, the relative rotation of the first ring gear 13 and the engine 1 with respect to the second carrier 24 is regulated, and hence the first ring gear 13, the engine 1, and the second carrier 24 can rotate together. Meanwhile, when the first clutch CL1 is released, the engine 1 and the first ring gear 13 are disconnected from the second carrier 24, and hence the engine 1 and the first ring gear 13 can rotate so as to be independent from the second carrier 24.

The second clutch CL0 is a clutch device that connects and disconnects the engine 1 and the first ring gear 13 to and from each other. The second clutch CL0 of this embodiment is disposed in the rotation shaft 2 of the engine 1. When the second clutch CL0 engages, the relative rotation between the rotation shaft 2 near the engine 1 and the first ring gear 13 is regulated, and hence the first ring gear 13 and the engine 1 can rotate together. Meanwhile, when the second clutch CL0 is released, the engine 1 is disconnected from the first ring gear 13, and hence the engine 1 and the first ring gear 13 can rotate so as to be independent from each other.

The brake B1 can regulate the rotation of the second carrier 24. The brake B1 regulates the rotation of the second carrier 24 when the engagement component near the second carrier 24 engages with the engagement component near the vehicle body, and hence can stop the rotation of the second carrier 24. Meanwhile, the brake B1 can allow the rotation of the second carrier 24 in a released state.

Each of the first clutch CL1, the second clutch CL0, and the brake B1 can be configured as, for example, a dog tooth engagement type, but the present invention is not limited thereto. For example, a friction engagement type or the like may be used. An actuator that drives the clutches CL0 and CL1 or an actuator that drives the brake B1 can be operated by an electromagnetic force or a hydraulic pressure, and the other known actuators can be used. In a case of a dog tooth engagement type, the dragging loss in a non-engagement state is small compared to a friction engagement type using a wet friction material, and hence high efficiency can be obtained. Further, in a case where the dog tooth type actuator is operated by an electromagnetic force, the hydraulic circuit for the clutches CL0 and CL1 or the brake B1 is not needed, and hence the T/A can be simplified and decreased in weight. Furthermore, in a case where the hydraulic actuator is employed, an electric oil pump or a mechanical oil pump driven by the rotation of the engine may be used as a hydraulic pressure source.

The clutches CL0 and CL1 and the brake B1 may be released by the driving force of the actuator against a biasing force of a return spring or the like or may be engaged by the driving force of the actuator against the biasing force.

The first carrier 14 and the second ring gear 23 are connected to each other so as to be rotatable together. In this embodiment, the second ring gear 23 is an internal-tooth gear that is formed in an inner peripheral surface of a cylindrical rotation body 3. Further, the first carrier 14 is connected to the rotation body 3 and rotates along with the rotation body 3. That is, the first carrier 14 and the second ring gear 23 are connected to each other through the rotation body 3, and rotate together. The outer peripheral surface of the rotation body 3 is provided with an output gear 6. The output gear 6 is connected to the output shaft of the hybrid vehicle 100 through a differential mechanism or the like. The output gear 6 is an output portion that outputs the power transmitted from the engine 1 and the electric rotating machines MG1 and MG2 through the planetary gear mechanisms 10 and 20 to the driving wheel. The power that is transmitted from the engine 1, the first electric rotating machine MG1, and the second electric rotating machine MG2 to the output gear 6 is transmitted to the driving wheel of the hybrid vehicle 100 through the output shaft. Further, the power that is input from the road surface to the driving wheel is transmitted from the output gear 6 to the hybrid vehicle driving device 1-1 through the output shaft.

The ECU 30 is an electronic control unit with a computer. The ECU 30 is connected to each of the engine 1, the first electric rotating machine MG1, and the second electric rotating machine MG2, and can control the engine 1 and the electric rotating machines MG1 and MG2. Further, the ECU 30 can control the release/engagement states of the first clutch CL1, the second clutch CL0, and the brake B1. In a case where an electric oil pump is provided as the hydraulic pressure source for the clutches CL1 and CL0 and the brake B1, the ECU 30 can control the electric oil pump.

In the hybrid vehicle 100, the hybrid running mode or the EV running mode can be selectively performed. The hybrid running mode indicates a running mode in which the hybrid vehicle 100 runs by using at least the engine 1 among the engine 1, the first electric rotating machine MG1, and the second electric rotating machine MG2 as a power source. In the hybrid running mode, at least one of the first electric rotating machine MG1 and the second electric rotating machine MG2 may be used as the power source in addition to the engine 1. Alternatively, one of the first electric rotating machine MG1 and the second electric rotating machine MG2 may be used as the power source and the other thereof may be used as the receiver for the reaction force of the engine 1. In addition, the first electric rotating machine MG1 and the second electric rotating machine MG2 may appropriately serve as motors or generators in response to the mode to be described later, and may idly rotate in a non-load state.

The EV running mode is a running mode in which the engine 1 is stopped and the vehicle runs by using at least one of the first electric rotating machine MG1 and the second electric rotating machine MG2 as the power source. Furthermore, in the EV running mode, at least one of the first electric rotating machine MG1 and the second electric rotating machine MG2 may generate power in response to the charging state of the battery or the running state, and at least one of the first electric rotating machine MG1 and the second electric rotating machine MG2 may be idly rotated.

As illustrated in FIG. 2, the hybrid vehicle driving device 1-1 of this embodiment can realize five modes by the combination of the engagement/release states of the first clutch CL1, the second clutch CL0, and the brake B1. In FIG. 2, the round symbols of the sections CL1 and CL0 respectively indicate the engagement states of the clutches CL1 and CL0, and the blanks of the sections CL1 and CL0 indicate the release states of the clutches. Further, the round symbols of the section B1 indicate the engagement state of the brake B1, and the blanks of the section B1 indicate the release state of the brake B1.

(HV-1 Mode)

Figure 3:
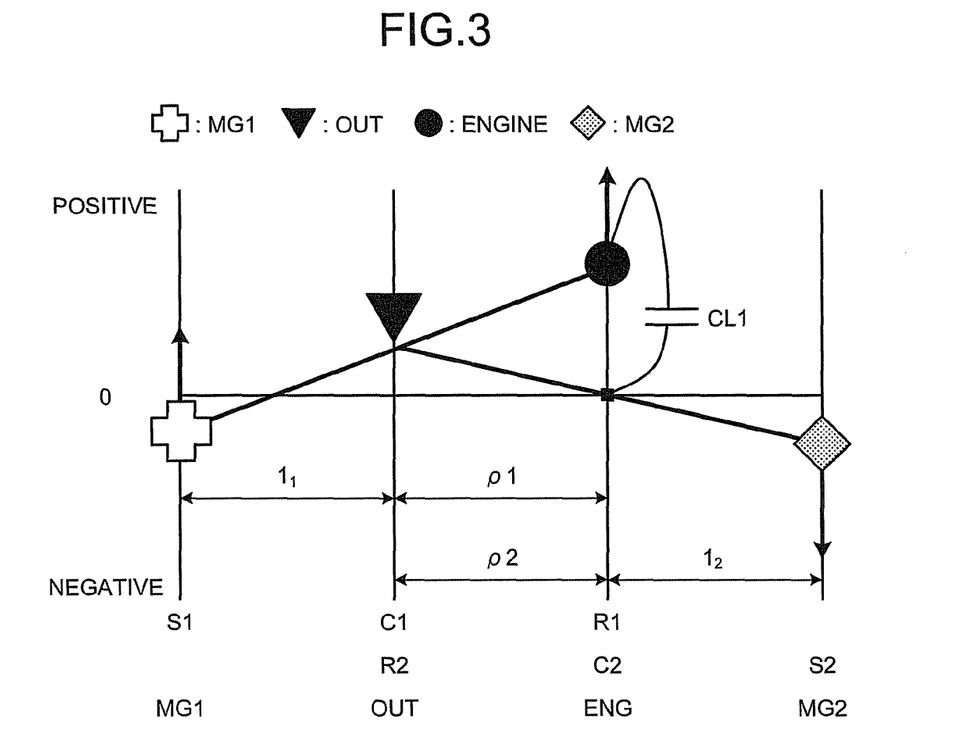
FIG. 3 is an alignment chart in a HV-1 mode.

In a case where the first clutch CL1 is released and the second clutch CL0 and the brake B1 are engaged, Mode 1 (the running mode 1) is realized, and hence the running operation can be performed in Mode 1. In this embodiment, the HV-1 mode below corresponds to Mode 1. The HV-1 mode is a HV running mode in which the vehicle runs by setting the hybrid vehicle driving device 1-1 to an electric torque control+MG2 deceleration mode. FIG. 3 is an alignment chart in the HV-1 mode. In the alignment charts including FIG. 3, S1 indicates the first sun gear 11, C1 indicates the first carrier 14, R1 indicates the first ring gear 13, S2 indicates the second sun gear 21, C2 indicates the second carrier 24, and R2 indicates the second ring gear 23. Further, ENG indicates the engine 1, and OUT indicates the output gear 6. It is assumed that the rotation directions of the first carrier 14 and the second ring gear 23 when the hybrid vehicle 100 runs forward are set to the positive direction and the torque (the upward arrow in the drawing) in the positive rotation direction is set to the positive torque.

The arrangement order of the respective rotation components of the first planetary gear mechanism 10 and the second planetary gear mechanism 20 in the alignment chart are set in order of the first sun gear 11 (S1), the first carrier 14 (C1) and the second ring gear 23 (R2), the first ring gear 13 (R1) and the second carrier 24 (C2), and the second sun gear 21 (S2).

Since the first clutch CL1 is released in the HV-1 mode, the first ring gear 13 (R1) and the second carrier 24 (C2) can rotate relative to each other, and the rotation of the second carrier 24 is regulated since the brake B1 engages. Further, since the second clutch CL0 engages, the first ring gear 13 is connected to the engine 1, and the output torque of the engine 1 is transmitted to the first ring gear 13.

In the HV-1 mode, the first planetary gear mechanism 10 serves as a power-split-type torque distribution planetary. The first planetary gear mechanism 10 and the first electric rotating machine MG1 can serve as electric torque controllers that changes the torque transmitted from the engine 1 to the output gear 6 by adjusting the reaction force generated in the first electric rotating machine MG1. Further, the second planetary gear mechanism 20 serves as a speed reducing planetary gear that transmits the rotation of the second electric rotating machine MG2 to the output gear 6 while reducing the rotation.

In the second planetary gear mechanism 20, the rotation direction of the second sun gear 21 becomes opposite to the rotation direction of the second ring gear 23. The second electric rotating machine MG2 can generate a driving force in the hybrid vehicle 100 in the forward running direction by generating a negative torque, and can generate a driving force in the hybrid vehicle 100 in the backward running direction (and the deceleration direction) by generating a positive torque.

(HV-2 Mode)

Figure 4:
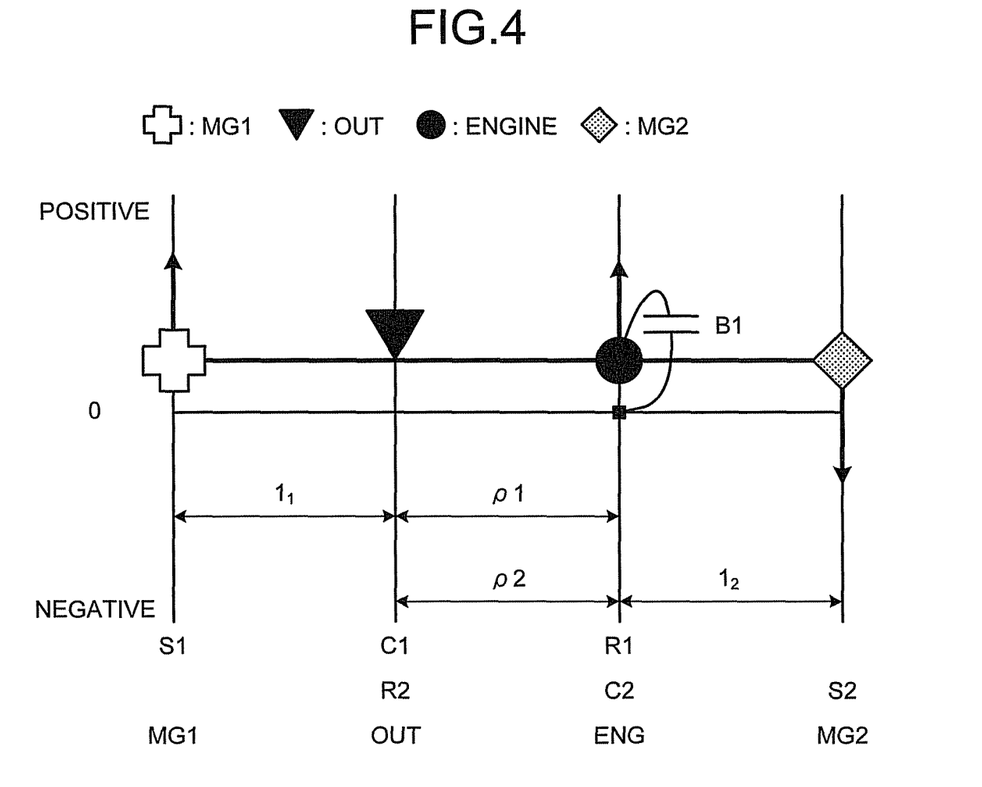
FIG. 4 is an alignment chart in a HV-2 mode.
Figure 5:
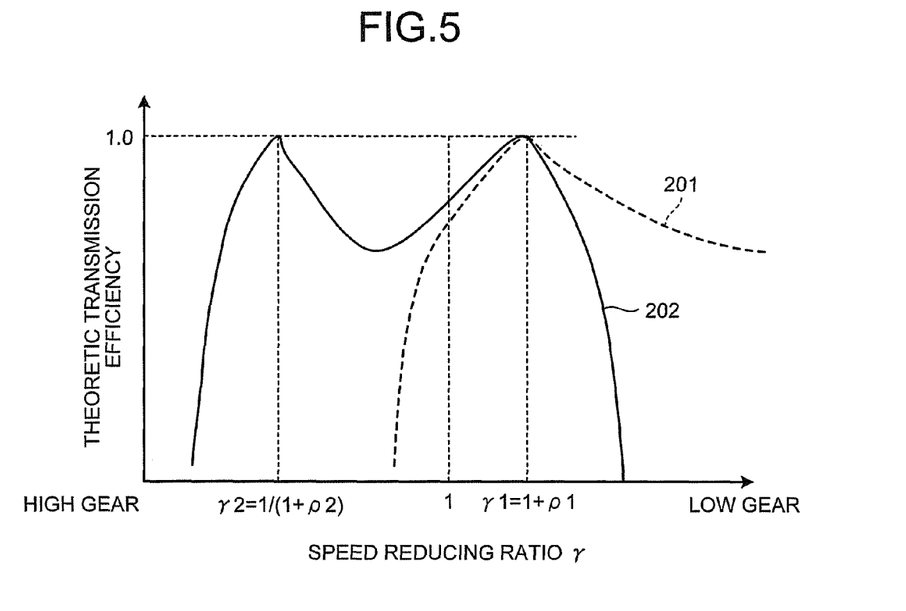
FIG. 5 is a diagram illustrating a theoretical transmission efficiency line according to the first embodiment.

In a case where the brake B1 is released and the first clutch CL1 and the second clutch CL0 are engaged, Mode 2 (the running mode 2) is realized, and hence the running operation can be performed in Mode 2. In this embodiment, the HV-2 mode below corresponds to Mode 2. The HV-2 mode is a complex split mode in which the first electric rotating machine MG1, the output gear 6, the engine 1, and the second electric rotating machine MG2 are coupled in this order as four planetary components. As will be described below by referring to FIGS. 4 and 5, a system is obtained in which a mechanical point is formed at a high gear and a low gear in the HV-2 mode, and hence there is an advantage that the transmission efficiency is improved in a wide range of a speed reducing ratio. Here, the mechanical point indicates a mechanical transmission point and a highly efficient operation point in which the electric path is zero. FIG. 4 is an alignment chart in the HV-2 mode, and FIG. 5 is a diagram illustrating a theoretical transmission efficiency line according to the first embodiment.

In the HV-2 mode, the first ring gear 13 and the second carrier 24 serve as one rotation component so as to rotate together, and the first carrier 14 and the second ring gear 23 serve as one rotation component so as to rotate together. Accordingly, the first planetary gear mechanism 10 and the second planetary gear mechanism 20 serve as four planetary components as a whole.

As illustrated in FIG. 4, the alignment chart of four planetary components including the first planetary gear mechanism 10 and the second planetary gear mechanism 20 is formed by arranging the rotation number of the first electric rotating machine MG1, the rotation number of the output gear 6, the rotation number of the engine 1, and the rotation number of the second electric rotating machine MG2 in this order on a line.

In the HV-2 mode, the first clutch CL1 is engaged so that the first ring gear 13 and the second carrier 24 are connected to each other. For this reason, the reaction force can be received by any one of the first electric rotating machine MG1 and the second electric rotating machine MG2 with respect to the power output from the engine 1. Accordingly, the reaction force of the engine 1 can be received by distributing the torque to one or both the first electric rotating machine MG1 and the second electric rotating machine MG2, and hence the highly efficient operation point can be obtained or the limitation of the torque due to the heat can be alleviated. Thus, the high efficiency of the hybrid vehicle 100 can be obtained. For example, the efficiency can be improved when the reaction force is preferentially received by the electric rotating machine that is operated with high efficiency among the first electric rotating machine MG1 and the second electric rotating machine MG2. Further, in a case where the torque is limited due to the heat in any one of the electric rotating machines, the necessary reaction force can be satisfied by the assisting operation using the regeneration (or the output) of the other electric rotating machine.

As will be described by referring to FIG. 5, in the HV-2 mode, not only the low gear but also the high gear have the mechanical point, and hence there is an advantage that the transmission efficiency is improved during the operation of the high gear. In FIG. 5, the horizontal axis indicates the speed reducing ratio, and the vertical axis indicates the theoretic transmission efficiency. Here, the speed reducing ratio γ indicates the ratio (the gear shift ratio) between the output torque and the input torque of the planetary gear mechanisms 10 and 20, and is expressed by the following equation (1).

$$\text{Speed reducing ratio } \gamma = \text{output torque/engine torque} \quad (1)$$

In the horizontal axis, the left side indicates the high gear with a small speed reducing ratio, and the right side indicates the low gear with a large speed reducing ratio.

In the theoretic transmission efficiency, the maximum efficiency becomes 1.0 in a case where the entire power input to the planetary gear mechanisms 10 and 20 is transmitted to the output gear 6 by the mechanical transmission without using the electric path. In FIG. 5, the dashed line 201 indicates the transmission efficiency line in the HV-1 mode, and the solid line 202 indicates the transmission efficiency line in the HV-2 mode. In the transmission efficiency line 201 of the HV-1 mode, the maximum efficiency is obtained at the speed reducing ratio γ1. The speed reducing ratio γ1 is a speed reducing ratio in which the rotation number of the first electric rotating machine MG1 (the first sun gear 11) becomes 0. For this reason, the electric path becomes 0 since the reaction force is received by the first electric rotating machine MG1, and an operation point is obtained in which the power can be transmitted from the engine 1 or the second electric rotating machine MG2 to the output gear 6 in accordance with only the transmission of the mechanical power. The speed reducing ratio γ1 is an under-drive-side speed reducing ratio, that is, a speed reducing ratio larger than 1. In the present specification, the speed reducing ratio γ1 is referred to as the "first mechanical transmission speed reducing ratio γ1". The transmission efficiency 201 in the HV-1 mode gently decreases as the speed reducing ratio γ becomes the low-gear-side value in relation to the first mechanical transmission speed reducing ratio γ1. Further, the transmission efficiency 201 of the HV-1 mode largely decreases as the speed reducing ratio γ becomes the high-gear-side value in relation to the first mechanical transmission speed reducing ratio γ1.

The transmission efficiency line 202 in the HV-2 mode includes a mechanical point at the speed reducing ratio γ2 in addition to the first mechanical transmission speed reducing ratio γ1. In the HV-2 mode, the rotation number of the first electric rotating machine MG1 becomes 0 at the first mechanical transmission speed reducing ratio γ1, and the mechanical point can be realized by receiving the reaction force through the first electric rotating machine MG1 in this state. Further, the rotation number of the second electric rotating machine MG2 becomes 0 at the speed reducing ratio γ2, and the mechanical point can be realized by receiving the reaction force through the second electric rotating machine MG2 in this state. The speed reducing ratio γ2 is referred to as the "second mechanical transmission speed reducing ratio γ2".

The transmission efficiency (202) in the HV-2 mode largely decreases compared to the transmission efficiency (201) in the HV-1 mode in response to an increase in the speed reducing ratio in the low-gear-side area in relation to the first mechanical transmission speed reducing ratio γ1. Further, the transmission efficiency line 202 in the HV-2 mode is curved toward the low efficiency in the speed reducing ratio area between the first mechanical transmission speed reducing ratio γ1 and the second mechanical transmission speed reducing ratio γ2. In this area, the transmission efficiency in the HV-2 mode is higher than the transmission efficiency in the HV-1 mode. The transmission efficiency (202) in the HV-2 mode decreases in accordance with a decrease in speed reducing ratio in the high-gear-side area in relation to the second mechanical transmission speed reducing ratio γ2.

In this way, since the HV-2 mode includes the mechanical point at the high-gear-side second mechanical transmission speed reducing ratio γ2 in relation to the first mechanical transmission speed reducing ratio γ1 in addition to the first mechanical transmission speed reducing ratio γ1, the transmission efficiency during the operation of the high gear can be improved. Accordingly, the fuel economy can be improved due to the improvement in the transmission efficiency in a high-speed running state. The second mechanical transmission speed reducing ratio γ2 is an over-drive-side speed reducing ratio, that is, a speed reducing ratio smaller than 1. Since the under-drive side has the first mechanical transmission speed reducing ratio γ1 and the over-drive side has the second mechanical transmission speed reducing ratio γ2, the transmission efficiency can be improved in a wide operation area.

Further, in the hybrid vehicle driving device 1-1 of this embodiment, the first mechanical transmission speed reducing ratio γ1 and the second mechanical transmission speed reducing ratio γ2 can be set so as to be independent from each other. The first mechanical transmission speed reducing ratio γ1 is expressed by the following equation (2).

$$\gamma_1 = 1 + \rho_1 \qquad (2)$$

Here, the first planetary ratio ρ1 is a gear ratio involved with the first planetary gear mechanism 10, and is obtained by (the number of teeth of the first sun gear 11)/(the number of teeth of the first ring gear 13). As illustrated in FIG. 4, the first planetary ratio ρ1 is a gear ratio between the first carrier 14 and the first ring gear 13 when the gear ratio between the first sun gear 11 and the first carrier 14 is set to 1. The first planetary ratio ρ1 is used to define the ratio between the power directly transmitted from the engine 1 to the output gear 6 and the power transmitted from the engine 1 to the first electric rotating machine MG1 in the HV-1 mode.

The second mechanical transmission speed reducing ratio γ2 is expressed by the following equation (3).

$$\gamma_2 = 1/(1+\rho_2) \qquad (3)$$

Here, the second planetary ratio ρ2 is a gear ratio involved with the second planetary gear mechanism 20, and is obtained by (the number of teeth of the second sun gear 21)/(the number of teeth of the second ring gear 23). As illustrated in FIG. 4, the second planetary ratio ρ2 is a gear ratio between the second carrier 24 and the second ring gear 23 when the gear ratio between the second sun gear 21 and the second carrier 24 is set to 1. The second planetary ratio ρ2 defines the speed reducing ratio from the second electric rotating machine MG2 to the output gear 6.

From the above-described equation (2), the first mechanical transmission speed reducing ratio γ1 is defined by the first planetary ratio ρ1 regardless of the second planetary ratio ρ2. Further, from the above-described equation (3), the second mechanical transmission speed reducing ratio γ2 is defined by the second planetary ratio ρ2 regardless of the first planetary ratio ρ1. Accordingly, when the gear ratio of the first planetary gear mechanism 10 is changed, the first mechanical transmission speed reducing ratio γ1 can be changed without having an influence on the second mechanical transmission speed reducing ratio γ2. Meanwhile, when the gear ratio of the second planetary gear mechanism 20 is changed, the second mechanical transmission speed reducing ratio γ2 can be changed without having an influence on the first mechanical transmission speed reducing ratio γ1.

In this way, in the hybrid vehicle driving device 1-1 of this embodiment, the first mechanical transmission speed reducing ratio γ1 and the second mechanical transmission speed reducing ratio γ2 can be set so as to be independent from each other, and the degree of freedom of setting the mechanical point is high. In other words, the hybrid vehicle driving device 1-1 can set the correlation between the speed reducing ratio and the transmission efficiency with a high degree of freedom. The first mechanical transmission speed reducing ratio γ1 and the second mechanical transmission speed reducing ratio γ2 can be arbitrarily set to desired speed reducing ratios, and hence there is an advantage in the improvement of the efficiency of the hybrid system.

Since the hybrid vehicle driving device 1-1 of this embodiment appropriately switches the HV-1 mode and the HV-2 mode in the hybrid running mode, the transmission efficiency can be improved. For example, when the HV-1 mode is selected in the area of the low-gear-side speed reducing ratio in relation to the first mechanical transmission speed reducing ratio γ1 and the HV-2 mode is selected in the area of the high-gear-side speed reducing ratio in relation to the first mechanical transmission speed reducing ratio γ1, the transmission efficiency can be improved in the area of the wide speed reducing ratio from the low gear area to the high gear area.

(EV-1 Mode)

Figure 6:
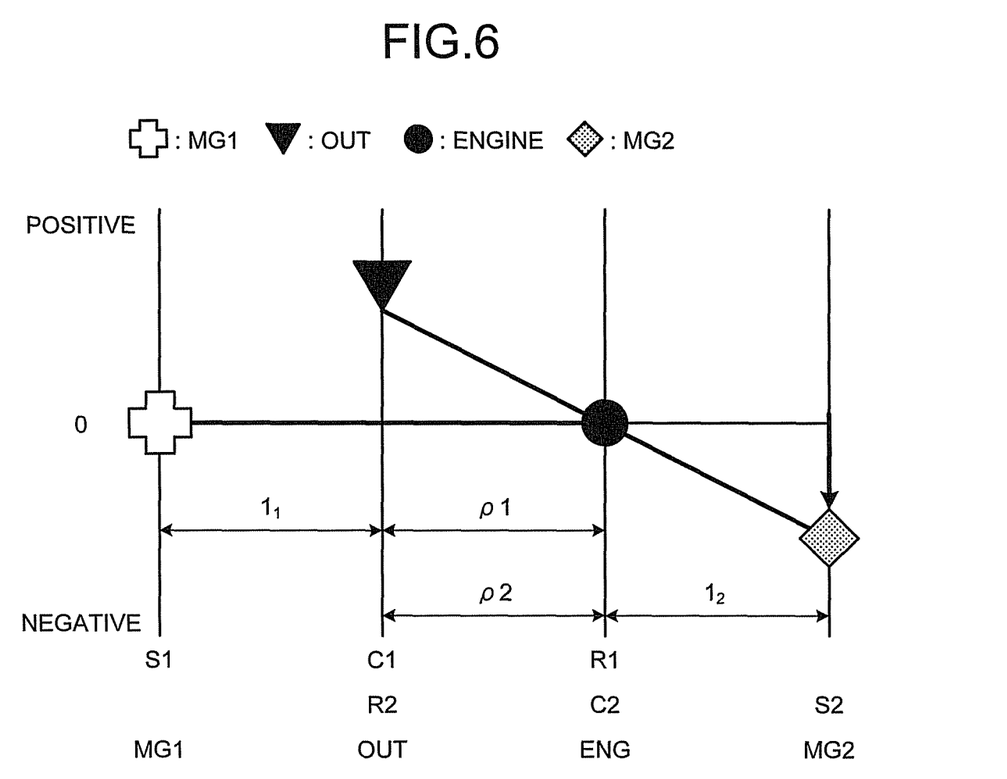
FIG. 6 is an alignment chart in an EV-1 mode.

In a case where the first clutch CL1 and the second clutch CL0 are released and the brake B1 is engaged, Mode 3 (the running mode 3) is realized, and hence the running operation can be performed in Mode 3. In this embodiment, the EV-1 mode below corresponds to Mode 3. The EV-1 mode is an EV running mode in which the engine 1 is stopped and the vehicle runs by using the second electric rotating machine MG2 as the power source. FIG. 6 is an alignment chart in the EV-1 mode.

In the EV-1 mode, since the first clutch CL1 is released, the first ring gear 13 and the second carrier 24 can rotate relative to each other. Further, since the second clutch CL0 is released, the engine 1 and the first ring gear 13 are disconnected from each other. That is, the first ring gear 13 can idly rotate. In the first planetary gear mechanism 10, the first carrier 14 rotates along with the output gear 6, the first ring gear 13 idly rotates, and the rotation of the first sun gear 11 is stopped. That is, the first electric rotating machine MG1 is stopped along with the first sun gear 11, and the engine 1 is stopped after being disconnected from the first ring gear 13. In the EV-1 mode, since the first electric rotating machine MG1 is stopped, the dragging loss of the first electric rotating machine MG1 does not occur.

In the second planetary gear mechanism 20, since the brake B1 is engaged, the rotation of the second carrier 24 is stopped. Since the second electric rotating machine MG2 rotates in the negative direction so as to generate the negative torque, the output gear 6 is rotated in the positive direction, and hence the hybrid vehicle 100 can run forward. Further, the second planetary gear mechanism 20 serves as a speed reducing planetary gear that transmits the rotation of the second electric rotating machine MG2 to the output gear 6 while reducing the rotation. In the EV-1 mode, when the charging state of the battery is a full charging state and the regeneration is not allowed, the second electric rotating machine MG2 is idly rotated, and hence a deceleration can be applied to the hybrid vehicle 100 with a large inertia amount.

(EV-2 Mode)

Figure 7:
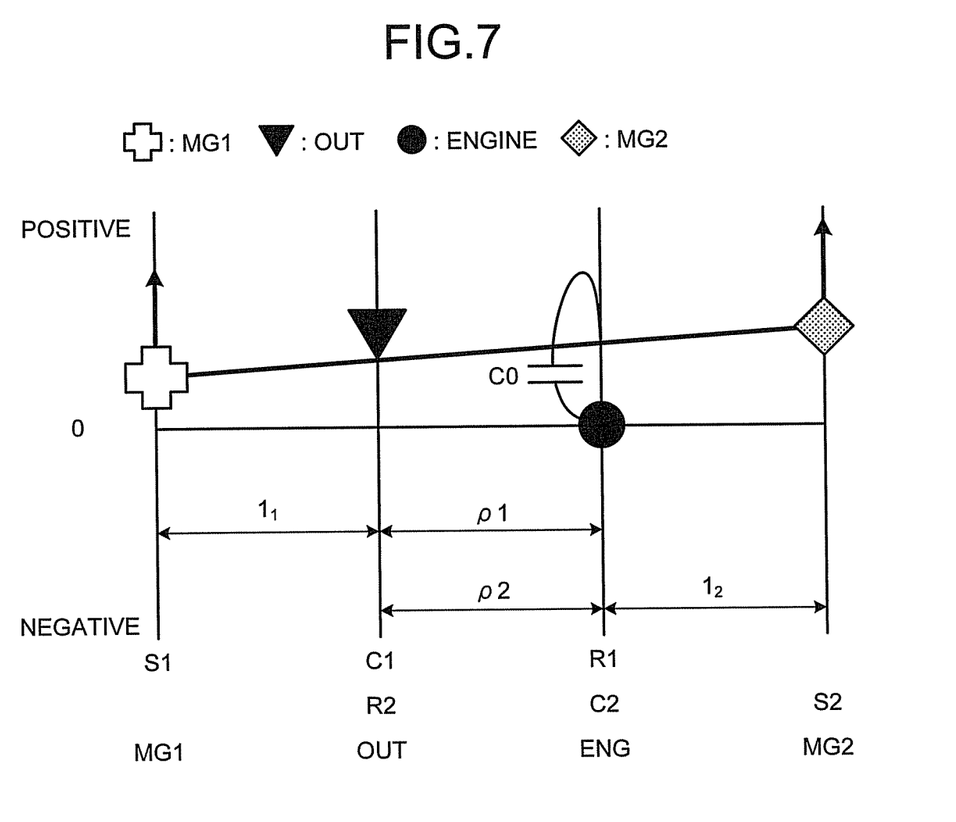
FIG. 7 is an alignment chart in an EV-2 mode.

In a case where the first clutch CL1 is engaged and the second clutch CL0 and the brake B1 are released, Mode 4 (the running mode 4) is realized, and hence the running operation can be performed in Mode 4. In this embodiment, the EV-2 mode below corresponds to Mode 4. The EV-2 mode is a split mode in which the engine 1 is stopped and the request torque is output from each of the first electric rotating machine MG1 and the second electric rotating machine MG2 so that the vehicle runs in the EV running mode. FIG. 7 is an alignment chart in the EV-2 mode. In the EV-2 mode, since the first clutch CL1 is engaged and the brake B1 is released, the first ring gear 13 and the second carrier 24 rotate together. Accordingly, the rotation number of the first electric rotating machine MG1, the rotation number of the output gear 6, and the rotation number of the second electric rotating machine MG2 are linearly arranged on the alignment chart. Further, since the second clutch CL is released, the engine rotation number becomes 0.

In the EV-2 mode, the ratio of the torque of the first electric rotating machine MG1 and the torque of the second electric rotating machine MG2 is defined by the gear ratio between the planetary gear mechanisms 10 and 20. In other words, when the first planetary ratio ρ1 and the second planetary ratio ρ2 are defined, the torques of the first electric rotating machine MG1 and the second electric rotating machine MG2 among the request torque are defined. Meanwhile, in the EV-2 mode, since the brake B1 is released, the rotation number of the first electric rotating machine MG1 and the rotation number of the second electric rotating machine MG2 can be adjusted. Accordingly, for example, the low-loss operation point can be selected in which the total loss of the loss of the first electric rotating machine MG1 and the loss of the second electric rotating machine MG2 is reduced. Further, in the EV-2 mode, in a case where the charging state of the battery is a full charging state and regeneration is not allowed, the first electric rotating machine MG1 and the second electric rotating machine MG2 are idly rotated together, and hence a deceleration can be applied to the hybrid vehicle 100 with a large inertia amount.

(EV-3 Mode)

Figure 8:
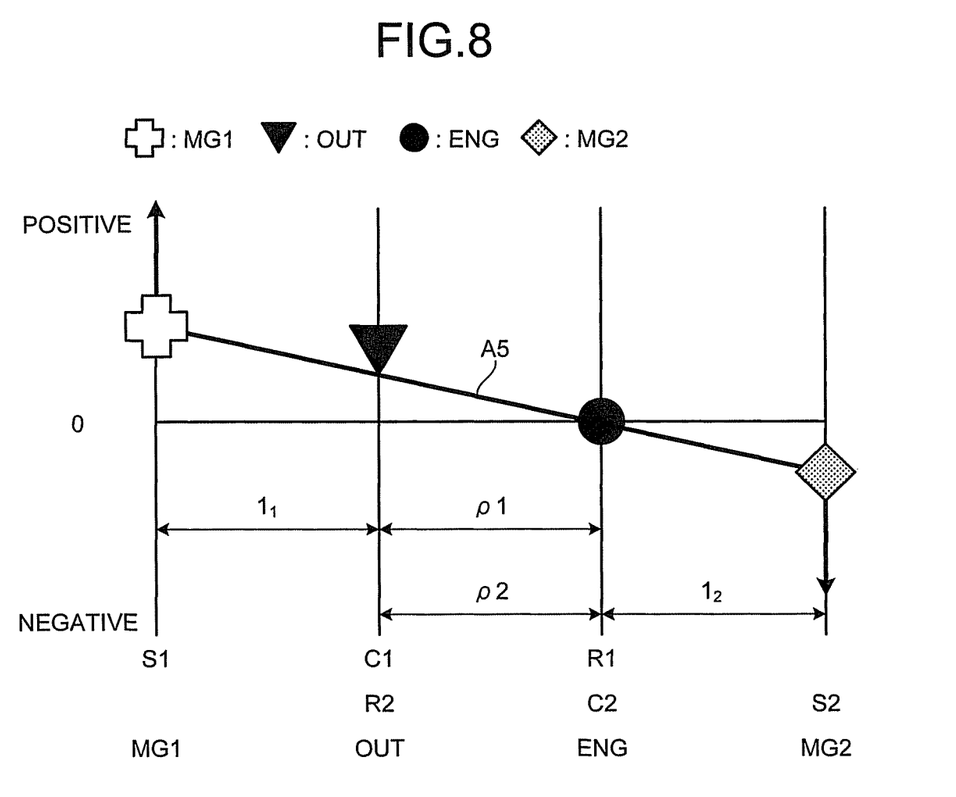
FIG. 8 is an alignment chart in an EV-3 mode.

In a case where the first clutch CL1 and the brake B1 are engaged and the second clutch CL0 is released, Mode 5 (the running mode 5) is realized, and hence the running operation can be performed in Mode 5. In this embodiment, the EV-3 mode below corresponds to Mode 5. The EV-3 mode is an EV running mode in which the engine 1 is stopped and the hybrid vehicle 100 runs by using at least one of the first electric rotating machine MG1 and the second electric rotating machine MG2 as the power source. FIG. 8 is an alignment chart in the EV-3 mode. In the EV-3 mode, since the first clutch CL1 and the brake B1 are engaged, the rotation of the first ring gear 13 and the second carrier 24 is regulated, and hence the rotation number becomes 0. Further, since the first clutch CL1 is engaged, the rotation number of the first electric rotating machine MG1, the rotation number of the output gear 6, and the rotation number of the second electric rotating machine MG2 are linearly arranged on the alignment chart. Further, since the second clutch CL is released, the engine rotation number becomes 0.

In the EV-3 mode, the rotation numbers of the first ring gear 13 and the second carrier 24 are fixed to 0. For this reason, the rotation number of the first electric rotating machine MG1 and the rotation number of the second electric rotating machine MG2 are respectively defined in response to the rotation number of the output gear 6. In other words, the line A5 connecting the point indicating the rotation number of the first electric rotating machine MG1, the point indicating the rotation number of the output gear 6, and the point indicating the rotation number of the second electric rotating machine MG2 on the alignment chart passes through the point of the engine rotation number=0 and the inclination thereof changes in response to an increase and a decrease in the rotation number of the output gear 6.

In the EV-3 mode, the rotation numbers of the electric rotating machines MG1 and MG2 can not be arbitrarily changed, but the output torques of the electric rotating machines MG1 and MG2 can be arbitrarily defined. Since the first ring gear 13 and the second carrier 24 are fixed, the first electric rotating machine MG1 and the second electric rotating machine MG2 can transmit the torque to the output gear 6 by using the first ring gear and the second carrier as the reaction force receivers. Accordingly, the hybrid vehicle 100 can run only by the output torque of the first electric rotating machine MG1, and the hybrid vehicle 100 can run only by the output torque of the second electric rotating machine MG2. In the EV-3 mode, since the torques of the first electric rotating machine MG1 and the second electric rotating machine MG2 can be arbitrarily defined, the loss of the hybrid vehicle driving device 1-1 can be reduced.

Figure 9:
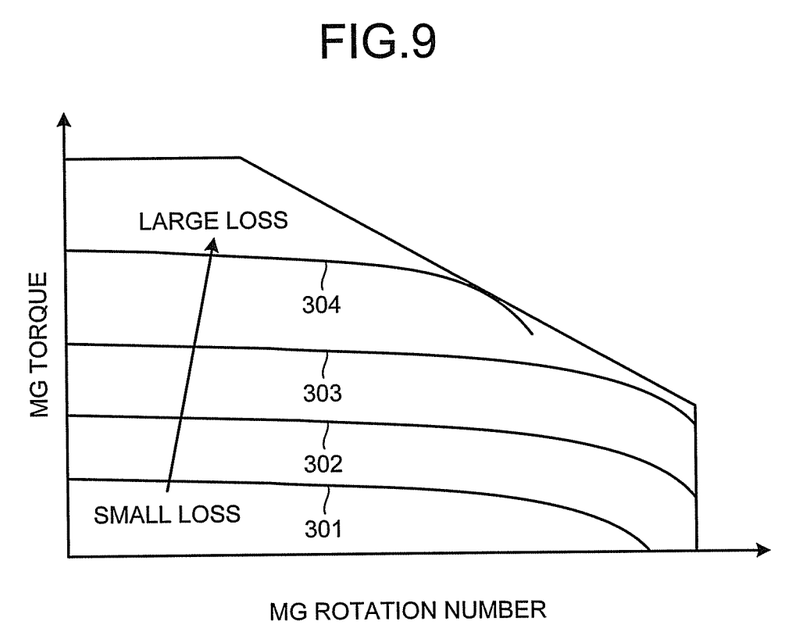
FIG. 9 is a conceptual diagram illustrating a loss degree of an electric rotating machine.

FIG. 9 is a conceptual diagram illustrating the loss degree of the electric rotating machine. In FIG. 9, the horizontal axis indicates the rotation number of the electric rotating machine, and the vertical axis indicates the torque of the electric rotating machine. Curves 301, 302, 303, and 304 are obtained by connecting the operation points having the same loss degree. As illustrated in FIG. 9, the loss of the electric rotating machine increases with an increase in torque and an increase in rotation number. The influence degree of the torque variation and the influence degree of the rotation number variation influencing the electric rotating machine are different from each other. The loss sensitivity with respect to the rotation number variation is small, and the loss sensitivity with respect to the torque variation is large. That is, in the control of the electric rotating machines MG1 and MG2, the loss is influenced by the adjustment of the torque compared to the adjustment of the rotation number.

In the EV-3 mode, the rotation number can not be arbitrarily adjusted, but the torques of the electric rotating machines MG1 and MG2 can be adjusted. Accordingly, in the EV-3 mode, the output torques of the electric rotating machines MG1 and MG2 capable of reducing the loss are selected, and hence the electric rotating machines MG1 and MG2 can be operated by the low-loss operation points.

The hybrid vehicle driving device 1-1 of this embodiment can selectively realize any one of the EV-1 mode, the EV-2 mode, and the EV-3 mode in the EV running mode. For example, when the EV-2 mode is selected at the high vehicle speed, the rotation number of the first electric rotating machine MG1 and the rotation number of the second electric rotating machine MG2 are appropriately adjusted. Accordingly, it is possible to suppress the rotation numbers of the electric rotating machines MG1 and MG2 from increasing too much, and hence to reduce the loss.

Further, when the EV-3 mode is selected in the running state of the high request torque, there is no limitation in the distribution of the torque by the gear ratios $\rho 1$ and $\rho 2$ as in the EV-2 mode, and the output torques of the electric rotating machines MG1 and MG2 can be defined. Accordingly, the allowable maximum torques of the first electric rotating machine MG1 and the second electric rotating machine MG2 can be output. That is, the hybrid vehicle driving device 1-1 of this embodiment with the EV-3 mode can realize the improvement of the maximum torque output in the EV running mode, and hence the EV running area can be extended to the high-load area.

Further, when the EV-3 mode is used, the maximum output torques requested in the electric rotating machines MG1 and MG2 can be suppressed. Since the loads are distributed to the electric rotating machines MG1 and MG2 with respect to the request torque of the hybrid vehicle 100, the maximum torques that can be output from the electric rotating machines MG1 and MG2 can be suppressed. Accordingly, the electric rotating machines MG1 and MG2 can be decreased in size. Further, the generation of heat of the electric rotating machines MG1 and MG2 can be reduced or the performance requested for the inverter can be reduced.

Further, in the EV-3 mode, since no dragging occurs in the clutches CL0 and CL1 and the brake B1, the transmission efficiency can be improved.

In this way, the hybrid vehicle driving device 1-1 of this embodiment can select the EV running mode which has appropriately high efficiency in response to the operation condition. Accordingly, the fuel economy can be improved due to the reduction of the loss, and hence the cruising distance of the hybrid vehicle 100 can be extended.

Since the hybrid vehicle driving device 1-1 of this embodiment enables the EV running mode in a high-load area while suppressing an increase in the size of the electric rotating machines MG1 and MG2 and can extend the cruising distance due to the reduction of the loss, the hybrid vehicle driving device can be appropriately used as a plug-in hybrid vehicle which is a hybrid vehicle that has a high EV running ratio.

The hybrid vehicle driving device 1-1 of this embodiment can switch five running modes from Mode 1 to Mode 5 by engaging or releasing a small number of engagement components such as the first clutch CL1, the second clutch CL0, and the brake B1.

Further, in the hybrid vehicle driving device 1-1 of this embodiment, the first electric rotating machine MG1 and the first planetary gear mechanism 10 are disposed so as to be adjacent to each other, the second electric rotating machine MG2 and the second planetary gear mechanism 20 are disposed so as to be adjacent to each other, and the first electric rotating machine MG1 and the second electric rotating machine MG2 are disposed at different positions in the axial direction with the planetary gear mechanisms 10 and 20 interposed therebetween. Accordingly, it is possible to suppress the tangling of the connection members connecting the rotation components of the planetary gear mechanisms 10 and 20 or the connection members connecting the rotation components of the planetary gear mechanisms 10 and 20 to the engine 1, the first electric rotating machine MG1, and the second electric rotating machine MG2.

For example, there is no need to dispose the rotation shaft 2 of the engine 1, the rotation shaft of the first electric rotating machine MG1, the rotation shaft of the second electric rotating machine MG2, and the like so as to be diverted to the outside of the planetary gear mechanisms 10 and 20 in the radial direction. In such a diverted arrangement, the cylindrical rotation shaft is disposed at the outside of the planetary gear mechanisms 10 and 20 in the radial direction, and hence there is a concern that the lubricant inside the planetary gear mechanisms 10 and 20 may not be easily discharged. However, such a problem can be prevented in the hybrid vehicle driving device 1-1 of this embodiment.

In the hybrid vehicle driving device 1-1, since the output gear 6 is disposed at the outermost diameter, the hybrid vehicle driving device may be easily applied to the multiaxial FF-type hybrid vehicle 100. The rotation shafts of the electric rotating machines MG1 and MG2 with high rotation numbers are disposed at a position near the rotation center. Accordingly, the centrifugal force generated in the rotation shafts of the electric rotating machines MG1 and MG2 is reduced, and hence the strength can be improved.

Second Embodiment

Figure 10:
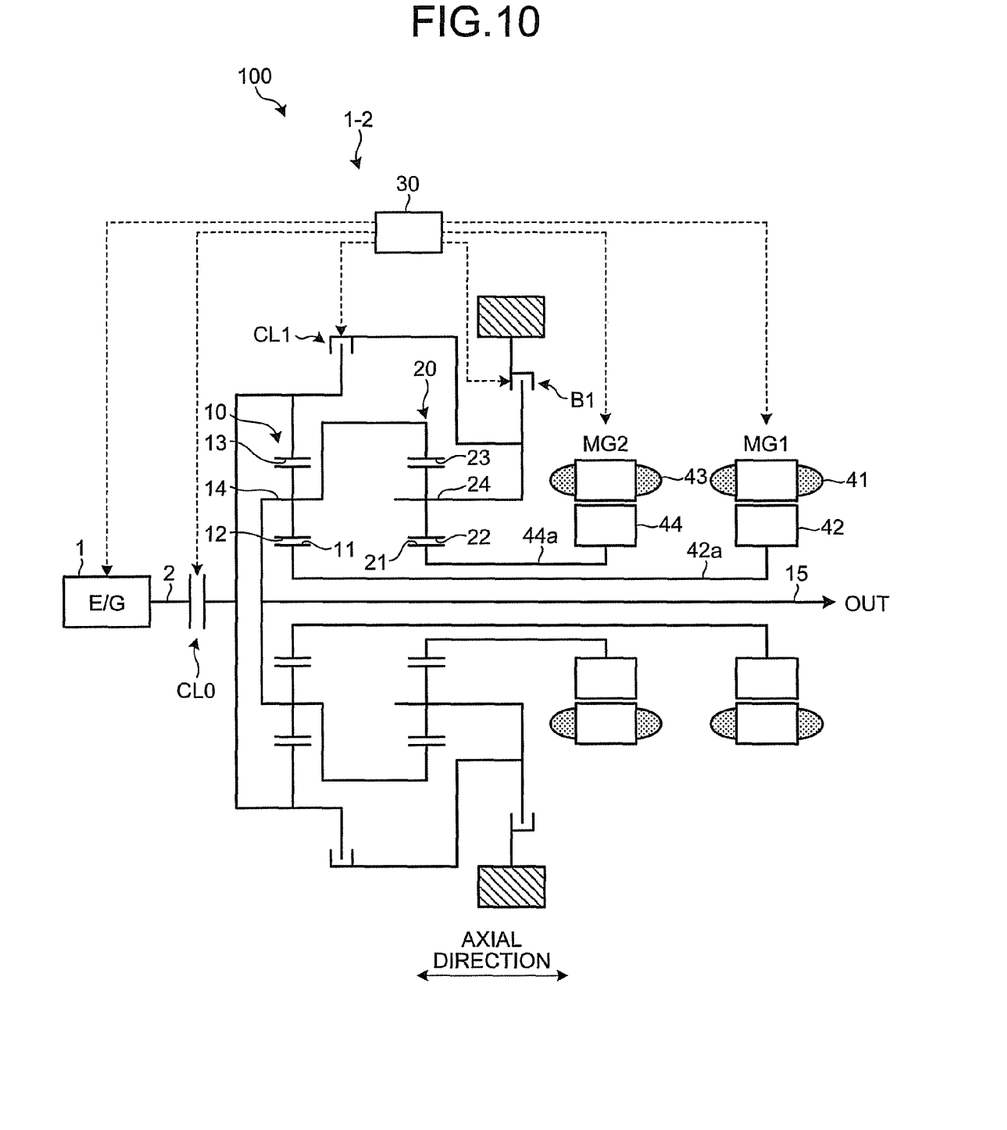
FIG. 10 is a skeleton diagram illustrating a main part of a hybrid vehicle according to a second embodiment.

Referring to FIG. 10, a second embodiment will be described. In the second embodiment, the same reference numerals will be given to the components having the same functions as those of the first embodiment, and the description thereof will not be repeated. A hybrid vehicle driving device 1-2 of this embodiment is different from the hybrid vehicle driving device 1-1 of the first embodiment in that the torque is output to the opposite side to the engine 1 in the axial direction. FIG. 10 is a skeleton diagram illustrating a main part of the hybrid vehicle according to the second embodiment.

The second clutch CL0, the first planetary gear mechanism 10, the first clutch CL1, the second planetary gear mechanism 20, the brake B1, the second electric rotating machine MG2, and the first electric rotating machine MG1 are disposed so as to be coaxial with the rotation shaft 2 of the engine 1 in order from the position near the engine 1. As in the hybrid vehicle driving device 1-1 of the first embodiment, the first sun gear 11 is connected to the first electric rotating machine MG1, the first carrier 14 is connected to the driving wheel, and the first ring gear 13 is connected to the engine 1. Further, the second sun gear 21 is connected to the second electric rotating machine MG2, the second carrier 24 is connected to the first ring gear 13 and the engine 1 through the first clutch CL1, and the second ring gear 23 is connected to the driving wheel through the first carrier 14.

A rotation shaft 44a of the rotor 44 of the second electric rotating machine MG2 is connected to the second sun gear 21. The rotation shaft 44a is hollow and is rotatably supported so as to be coaxial with the rotation shaft 2 of the engine 1. A rotation shaft 42a of the rotor 42 of the first electric rotating machine MG1 is connected to the first sun gear 11. The rotation shaft 42a is disposed at the inside of the rotation shaft 44a in the radial direction, and is rotatably supported so as to be coaxial with the rotation shaft 2 of the engine 1. The rotation shaft 42a is hollow.

A transmission shaft 15 is disposed at the inside of the rotation shaft 42a of the first electric rotating machine MG1 in the radial direction, and is rotatably supported so as to be coaxial with the rotation shaft 2 of the engine 1. In the hybrid vehicle driving device 1-2 of this embodiment, the transmission shaft 15 is an output portion that outputs the power transmitted from the engine 1 and the electric rotating machines MG1 and MG2 through the planetary gear mechanisms 10 and 20 to the driving wheel. The transmission shaft 15 is formed so that one end in the axial direction is connected to the first carrier 14 and the other end is connected to the driving wheel through the differential mechanism and the like. The transmission shaft 15 extends in the axial direction from the inner position of the first planetary gear mechanism 10 in the radial direction to the opposite position to the engine 1 in relation to the first electric rotating machine MG1.

The hybrid vehicle driving device 1-2 can realize the running modes from Mode 1 to Mode 5 by switching the engagement/release states of the clutches CL0 and CL1 and the brake B1 as in the hybrid vehicle driving device 1-1 of the first embodiment. The hybrid vehicle driving device 1-2 may be mounted on, for example, the FR-type hybrid vehicle 100.

The contents disclosed in the above-described embodiments can be appropriately combined with each other.

REFERENCE SIGNS LIST 1-1, 1-2 hybrid vehicle driving device
1 engine
10 first planetary gear mechanism
11 first sun gear
13 first ring gear
14 first carrier
20 second planetary gear mechanism
21 second sun gear
23 second ring gear
24 second carrier
B1 brake
CL0 second clutch
CL1 first clutch (clutch)
MG1 first electric rotating machine
MG2 second electric rotating machine
γ1 first mechanical transmission speed reducing ratio
γ2 second mechanical transmission speed reducing ratio

The invention claimed is:

1. A hybrid vehicle driving device comprising:
a first planetary gear mechanism;
a second planetary gear mechanism;
a first clutch;
a second clutch configured to connect and disconnect a ring gear of the first planetary gear mechanism and an engine to and from each other;
a brake configured to regulate rotation of a carrier of the second planetary gear mechanism in an engagement state, wherein
a sun gear of the first planetary gear mechanism is connected to a first motor generator, a carrier of the first planetary gear mechanism is connected to a driving wheel, the ring gear of the first planetary gear mechanism is connected to the engine, and
a sun gear of the second planetary gear mechanism is connected to a second motor generator, the carrier of the second planetary gear mechanism is connected to the ring gear of the first planetary gear mechanism and the engine through the first clutch, and a ring gear of the second planetary gear mechanism is connected to the driving wheel.

2. The hybrid vehicle driving device according to claim 1, wherein
a plurality of running modes can be switched by engaging or releasing the first clutch, the second clutch, and the brake, respectively, and
a running operation in Mode 5 is realized by engaging the first clutch and the brake and releasing the second clutch.

3. The hybrid vehicle driving device according to claim 1, wherein
a plurality of running modes can be switched by engaging or releasing the first clutch, the second clutch, and the brake, respectively, and
three modes can be selectively realized as an EV running mode in which the engine is stopped and the hybrid vehicle runs by using at least one of the first motor generator and the second motor generator as a power source, the three modes including Mode 3 in which the first clutch and the second clutch are released and the brake is engaged, Mode 4 in which the second clutch and the brake are released and the first clutch is engaged, and Mode 5 in which the second clutch is released and the first clutch and the brake are engaged.

4. The hybrid vehicle driving device according to claim 1, wherein
the second clutch, the first motor generator, the first planetary gear mechanism, the first clutch, the second planetary gear mechanism, the brake, and the second motor generator are disposed so as to be coaxial with a rotation shaft of the engine in order from a position near the engine.

5. The hybrid vehicle driving device according to claim 1, wherein
a running mode can be realized as a hybrid running mode in which the hybrid vehicle runs by using at least the engine among the engine, the first motor generator, and the second motor generator as a power source, the running mode including Mode 1 in which the first clutch is released and the second clutch and the brake are engaged.

* * * * *